United States Patent [19]

Wulff

[11] Patent Number: 4,524,540
[45] Date of Patent: Jun. 25, 1985

[54] FLY LINE

[76] Inventor: Lee Wulff, Beaverkill Rd., Lew Beach, N.Y. 12753

[21] Appl. No.: 402,151

[22] Filed: Jul. 26, 1982

[51] Int. Cl.³ .............................................. A01K 91/00
[52] U.S. Cl. .................................................... 43/44.98
[58] Field of Search ....................................... 43/44.98

[56] References Cited

U.S. PATENT DOCUMENTS

| | | | |
|---|---|---|---|
| 2,184,187 | 12/1939 | Hildebrandt | 43/44.98 |
| 2,250,832 | 7/1941 | Hedge | 43/44.98 |
| 2,774,173 | 12/1956 | Thienemann | 43/44.98 |
| 3,464,140 | 9/1969 | Carabasse | 43/44.98 |
| 3,864,865 | 2/1975 | Swisher | 43/44.98 |

Primary Examiner—Gene P. Crosby
Attorney, Agent, or Firm—Charles R. Fay

[57] ABSTRACT

A line for fly casting is disclosed having a forward continuous taper from a widest point adjacent the center of the line, more or less, down to a minimum at the forward end of the line where a leader and fly are to be located. A reverse taper joins the forward continuous taper. The remainder of the line is a relative small, constant diameter and attaches to a reel.

7 Claims, 4 Drawing Figures

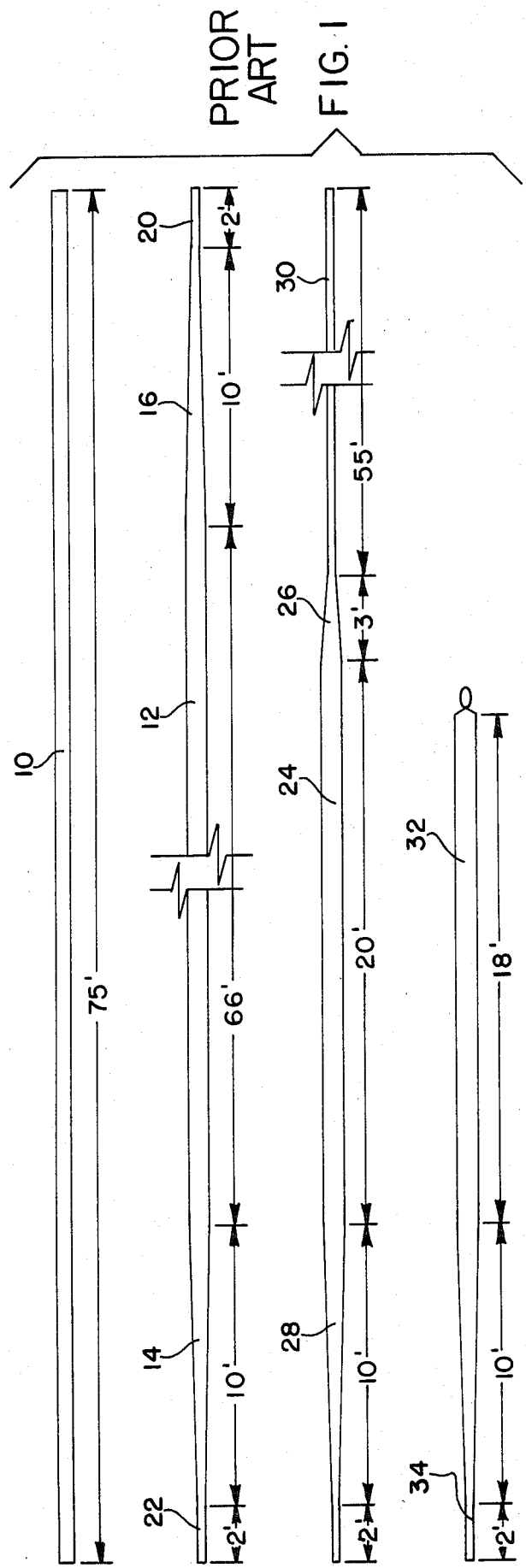
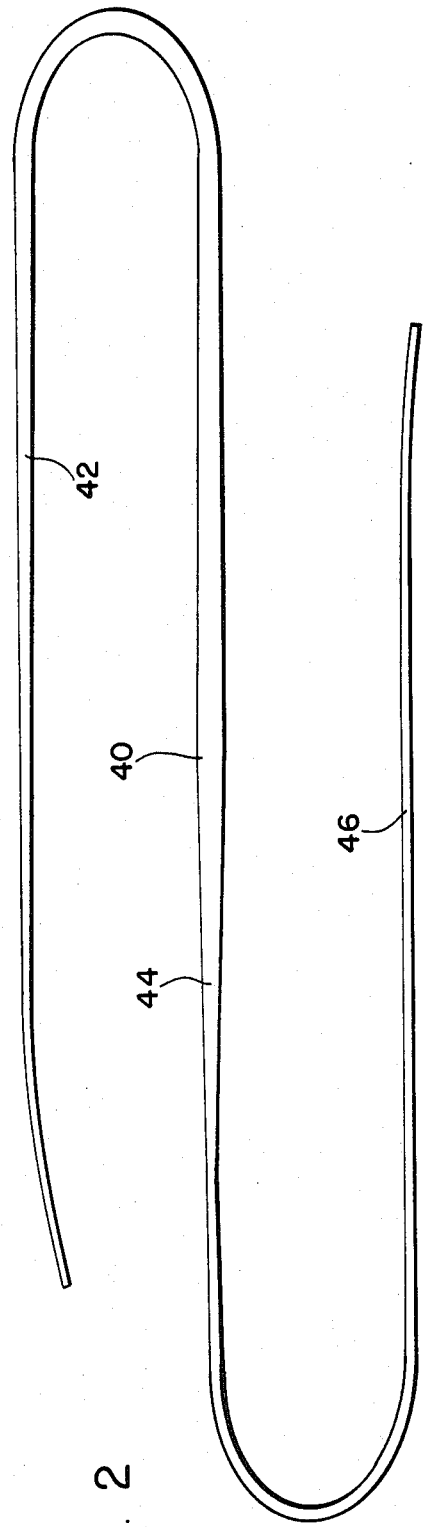
FIG. 1 PRIOR ART
FIG. 2

FLY LINE

BACKGROUND OF THE INVENTION

There are four main typical fly casting lines: level, double taper, weight forward, and shooting taper. These are ordinarily braided with a plastic coating, although the shooting taper head may be attached to a monafilament shooting line.

A level line has a uniform diameter from end to end. The length of this line is typically seventy-five feet as it is difficult to cast any farther than this but, of course, level lines may be made in any length and in various diameters depending on the rod with which it is to be used.

The double taper line has a taper at each end and is normally of the same diameter at its central section as a corresponding level line. The tapers consist of gradually decreasing diameters from the relatively thick central portion toward the ends, merging into short level terminals. A typical double taper line is of ninety foot overall length, with e.g. a sixty-six foot center and ten foot long tapers. As with a level line, either end of the double taper line is usable for the leader and fly, the other end being wound on the spool of the reel. The fly can be cast more delicately using the double taper than with the level line.

Greater distance can also be had with the weight forward line which has a heavy section at the fly end of the lighter main length of the line, and a typical weight forward line is ninety feet overall, with a two foot level forward terminal, a ten foot taper, a twenty foot thickest part, a very short reverse taper, and a fifty-five foot main length.

A shooting head taper line is a variation of the weight forward type. The lines are formed by extruding plastic over a suitable core, but with shooting head taper can be connected to a separate suitable monofilament. The variations in diameter are variations in the thickness of the plastic coating. There are other types which are not well-known and do not concern the present invention.

There are two main ways in which to use any of the lines to cast out a fly. These are explained in detail in the publication by the applicant and Joan Wulff, "Casting With the Fly Rod" which is an excerpt from a book,"-Fly Fisherman's Complete Guide to Fishing With the Fly Rod". This excerpt is copyright 1978 by Ziff-Davis Publishing Company. Another reference is McClain's "Fishing Encyclopedia". Briefly, the most used method is "overhead"; that is, extended line is taken completely off the water, turned over in the air above and behind the caster on the back cast, with rod erect, or at eleven o'clock, forming a loop in a vertical plane, and then driving the rod forward and down to return the line out straight onto the water, with or without an additional length of line pulled out on the forward cast.

The more unusual method is called "roll-casting". Keeping the fly on the water, the rod is slowly brought back and up to about the same back cast position, and then driving the rod forward and down, whereupon the line (and fly) are lifted up in a "roll" in the air and moved forward to a light on the water in a straight line. Most people find the roll cast more difficult to accomplish properly, but it avoids complications with the back cast which is behind the caster while the roll cast is in front of the caster where it can be observed.

The present invention improves the line to make accurate and delicate casting easier and longer, especially aiding the roll caster.

The rolling forward of the line on the cast is more efficient if, as the line rolls out in the cast, a line of heavy diameter is constantly turning over its lighter line. This makes the forward section of this invention unique and more efficient than lines of the prior art.

SUMMARY OF THE INVENTION

The present invention comprises a fly line having a forward taper for approximately one-half or less of the entire line. The advantages include better casting because for most of the cast the energy from a greater diameter of line near the rod is passed on to the line of lessening diameter with a constantly increasing factor as the roll of the line moves forward. While this improves the conventional overhead cast, it provides an especial benefit to the roll cast. The proportion of the tapered portion of the line to the level line to the rear, or reel side of the line may vary considerably and can be less than one-half the total length to a great deal more than one-half the total length of the line, but the main characteristic of the new line is the very gradual taper of approximately one-half the length of the line so that practically all the loop is tapered. This also has the ability to present the fly with maximum delicacy since the long front single taper keeps the heavier, more visible sections of the line farthest from the fish. Accuracy in distance casts is also controlled much better than with forward taper lines of the prior art. Also, the novel line is suitable for a wider range of rods than the prior art types of fly lines.

BRIEF DESCRIPTION OF THE GOODS

FIG. 1 is a composite diagrammatic view of the main typical fly lines of the prior art;

FIG. 2 is a diagram of the invention;

PREFERRED EMBODIMENTS OF THE INVENTION

Figure 3:
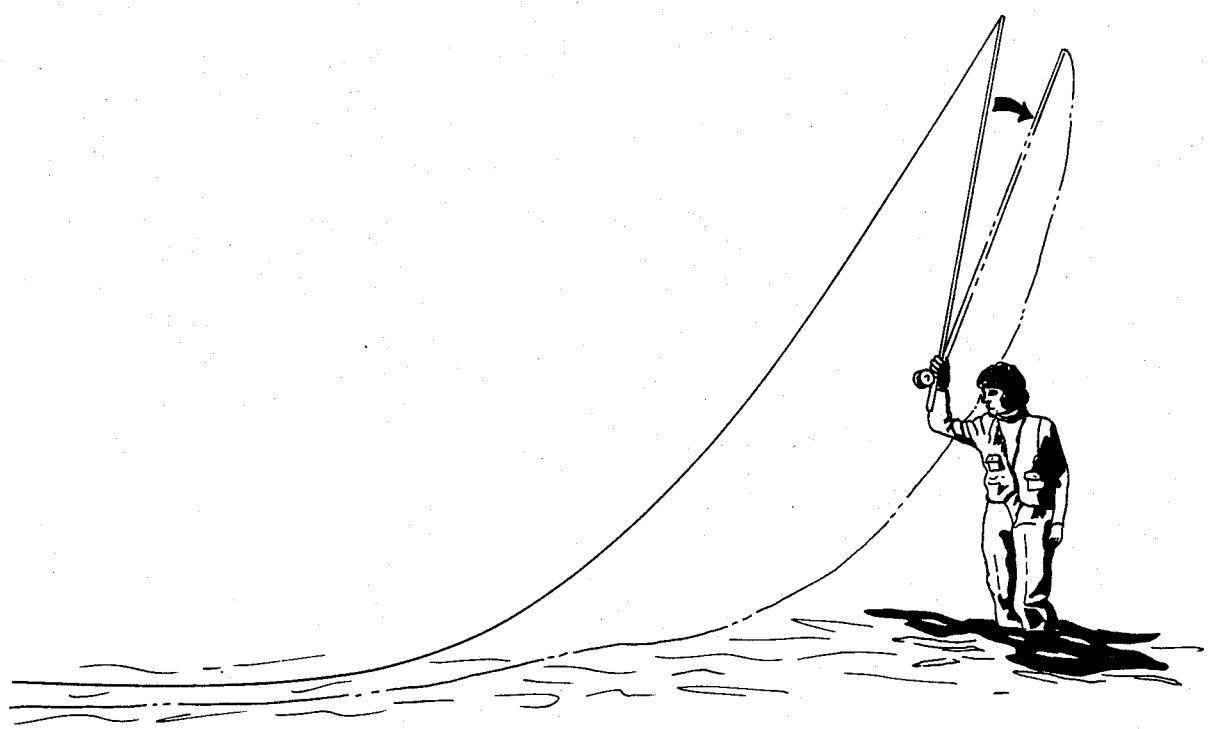
FIG. 3 is a view showing a fly caster ready to execute a roll cast.
Figure 4:
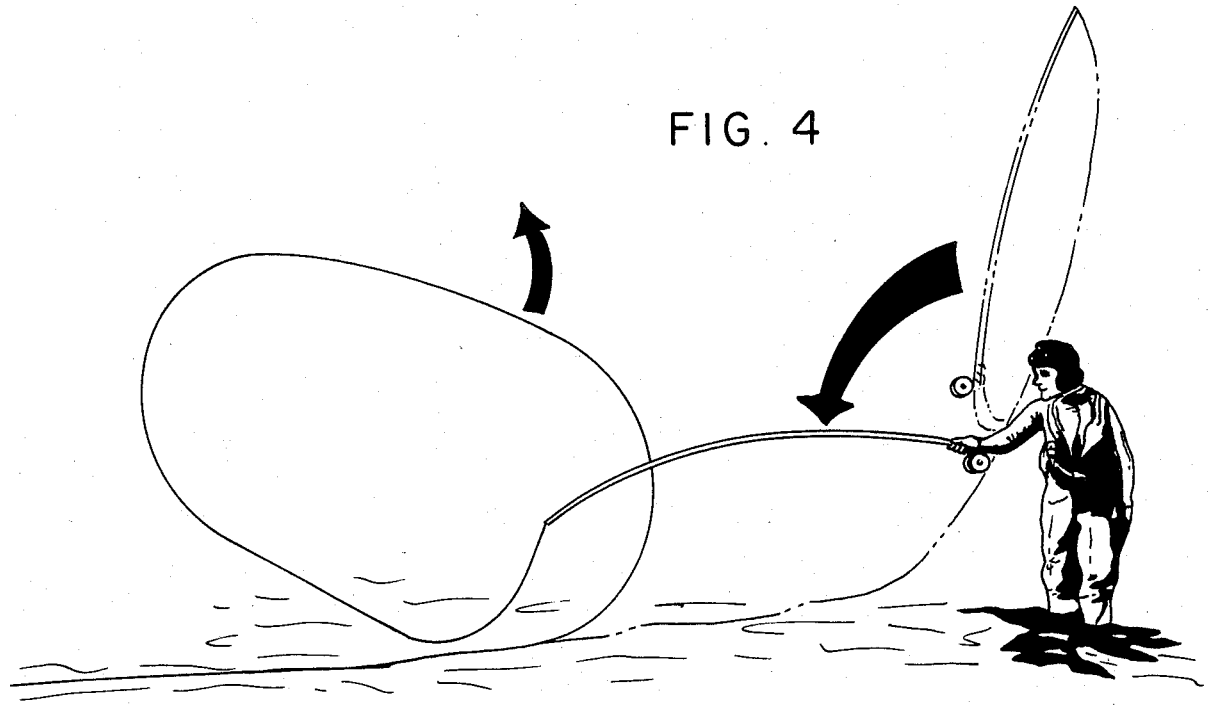
FIG. 4 is a like view illustrating the roll cast.

FIG. 1 shows the chief typical prior art fly lines. The level line of constant diameter end to end is indicated at 10.

The double taper has a central thick portion 12 and at each end a taper 14, 16, tapering to a short level terminal portion 20 and 22.

A weight forward line is shown at 24 having a forward reduced level terminus 26, and a taper 28 and a long shooting line of relatively small diameter at 30.

A shooting taper 32 has a terminal level 34 and a connection 36 to a long level shooting line not shown but which may be monofilament.

In all these cases, the drawings show approximately the various lengths of the different parts of the lines and most commercially available fly lines do not vary from these measurements to any great extent.

The present invention is shown in FIG. 2, and the proportions of the different parts of this line are very different from the prior art, but the overall length is about the same as most fly lines; i.e., about ninety feet. The first fifty feet or thereabout of the line is one continuous taper down to the leader, not shown, from a point 40 about halfway of the ends of the line. One example is that this taper is about forty to forty-five feet, but in the illustration this taper is less than one-half the length of the line and is indicated at 42. A very good fly caster can cast ninety feet of line, and a lesser caster will probably get out fifty to sixty feet. Thus, in long casts the entire taper will usually be in the water and the largest diameter of the taper will be ahead of the rod tip.

The next section of the line towards the reel may be very short; e.g. four to six feet, see 44. This section tapers reversely to the level constant diameter shooting line 46 about thirty to forty feet.

The best line for making a roll cast or any other cast is a line that tapers constantly from a large diameter and heavy weight to a fine diameter and minimum weight near the fly for the leader connection. In roll casting such a line, the heavier line near the rod is constantly passing its energy on to lighter line as the roll moves forward. This is much more efficient than roll casting level line or level line sections where the line in the "roll" must lift and push forward line of equal weight.

This invention is to have a roll casting taper in the front half (approx.) of the line and then use this long roll casting segment as a forward taper or "head" to make long overhead casts. This forward taper belly can be used by normal casting to make casts of approximately the same distance as those made by forward tapers or double tapers now available.

Some other examples of the new line follow:

Length about 90 feet overall with a forward taper in the neighborhood of 56 feet; tapering from 0.070 inch at the greatest diameter to 0.035 inch at the forward end; a short reverse taper from 0.080 inch to 0.035 inch to the opposite end of the line.

Length 90 feet, forward taper 50 feet from 0.060 inch to 0.030 inch; short reverse taper, to 34 feet at 0.035 inch.

Length 90 feet, forward taper 40 feet from 0.050 inch to 0.025 inch; short reverse taper to 44 feet at 0.035 inch.

Length 90 feet, forward taper 40 feet from 0.040 inch to 0.025 inch; reverse taper to 44 feet at 0.035 inch.

These examples will cover most rods in the range from trout to salmon and bass.

The great advantages of this fly line are: (1) The ability to roll cast for the full distance of the forward tapered section far better than with any other line, (2) to be able to cast the fly with maximum delicacy because the long front single taper keeps the heavier, more visible sections of the line farthest from the fish and (3) to be able to cast well for distance. No other type of line now available has all these advantages.

To sum up: this line will roll cast better and with more delicacy for the full distance of the long front single taper (and leader) than any other type of fly line. In overhead casting (the conventional method) it will permit the most delicate presentation of the fly because of the long front single taper which keeps the heavy, more visible section of the line farthest from the fish. It will permit "shooting" the forward single tapered section for long distances in overhead casting while still delivering the fly with greater delicacy than the presently available fly lines.

The lengths of the front taper, the back taper and the running or "shooting" line will vary with the length and power of the fly rod with which it is to be used.

An example of the new fly casting line, which is to be used e.g. with an eight foot rod using a conventional No. 6 line, would taper from a diameter of 0.025" at the forward end to 0.050" e.g. 42 feet or thereabouts, dropping back to 0.030" the next four feet, for example, and continue back to the rear end of the line say 44 feet, at a diameter of 0.030". This line is efficient with the eight foot rod, preferably graphite and weighing two and one-half ounces.

Another line could be longer or shorter in the front taper and shorter in shooting line with appropriate diameters, and there are many other forms of the invention dependent on the rods to be used, within the purview of the invention and coming within the limits of the claims herein.

It is to be particularly noted that in FIGS. 1 and 2, the various thickness of the lines are greatly exaggerated in order to better illustrate the invention. In fact, the eye cannot pick out the differences in diameter of the forward taper except over lengths of several yards.

I claim:

1. A fly line for fly casting comprising a certain length of line having a forward portion for attachment of a leader and a rear portion for attachment to a spool of a reel, less than one-half of the line at the forward end thereof tapering from a thickest portion adjacent the center of the line to a narrowest portion adjacent to the forward terminal end of the line to which the leader is to be applied, a short reverse taper beginning at the thickest portion of the tapering forward end of the line, and the remainder of the line following said reverse taper being generally of constant diameter less than the tapered forward portion of the fly line.

2. The fly line of claim 1 wherein the tapering forward end is continuously and evenly tapered from its widest portion to its narrowest portion.

3. The fly line of claim 1 wherein the tapering forward end has a length which is just short of one-half of the total length of line.

4. A fly line for fly casting having a total length of approximately ninety feet, a forward end to which a leader is to be applied, a following end which is to be attached to a fly casting reel,
   wherein a tapered portion of the line tapers evenly and continuously from a maximum to a minimum at the forward end of the line and approximates fifty feet, there being a reverse taper at the intermediate portion of the line at the widest diameter of the forward end tapered portion, said reverse taper being very short and joining with a portion of line of between thirty and forty feet in length of constant diameter, the terminal end portion of which in a direction away from the taper is to be applied to the spool of a fly reel.

5. A fly line for fly casting having a total length of approximately ninety feet comprising a forward portion to which a leader is to be applied, a following level portion which is to be attached to a fly casting reel, the forward end including a tapered portion, and an intermediate portion,
   wherein the tapered portion of the line tapers evenly and continuously from a maximum to a minimum at the forward end of the line, the tapered portion being approximately one-half of the line, there being a short transition reverse taper at the intermediate portion of the line at the widest diameter of the forward end tapered portion, said reverse taper joining with the level portion of a line to comprise a total of approximately ninety feet in length.

6. A fly line having a predetermined length, a forward end, a following rear end, and a generally central portion, the line from the central portion being generally of even diameter to the following rear end, the line from the central portion to the forward end including a relatively short portion of reverse taper and a length from said short portion towards the forward end being of smooth continuous taper down from a maximum at the reverse taper portion to a minimum adjacent the forward end, wherein said length of said smooth continuous taper is at least one-half as long as the length of the line and extends from the central portion to the forward end.

7. The fly line of claim 6 wherein the rear end of the line is slightly thicker than the minimum adjacent the forward end of the line.

* * * * *